Figure 1:
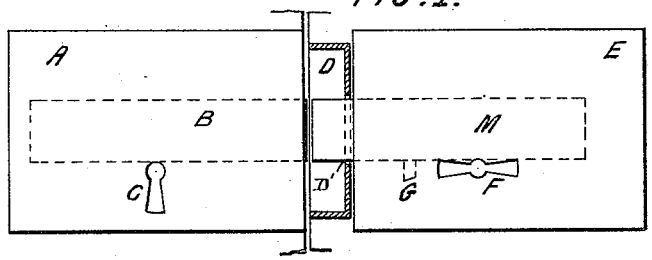

(No Model.) 2 Sheets—Sheet 1.

L. WEIL.
COMBINED VALVE LOCKING AND STORE CLOSING MECHANISM.

No. 443,886. Patented Dec. 30, 1890.

WITNESSES:

INVENTOR
Leopold Weil
BY
Ernest C. Webb
ATTORNEY.

(No Model.) 2 Sheets—Sheet 2.
L. WEIL.
COMBINED VALVE LOCKING AND STORE CLOSING MECHANISM.
No. 443,886. Patented Dec. 30, 1890.
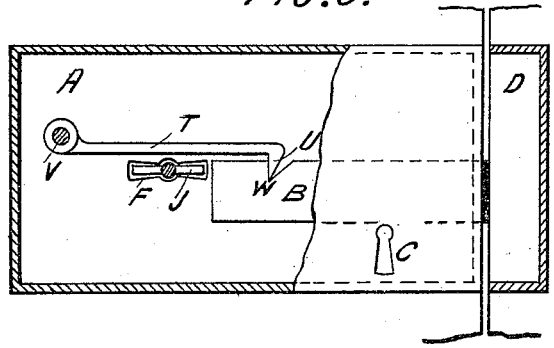
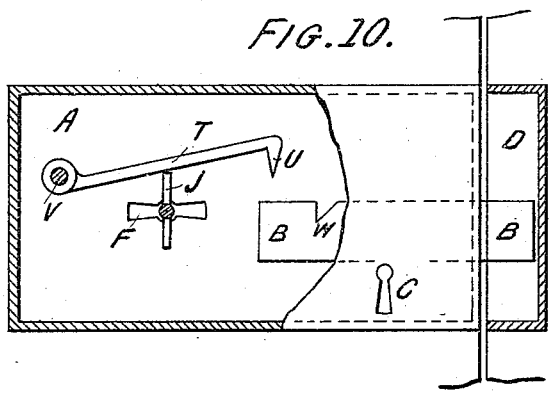
WITNESSES:
INVENTOR
Leopold Weil
BY Ernest C. Webb
ATTORNEY.

UNITED STATES PATENT OFFICE.

LEOPOLD WEIL, OF NEW YORK, N. Y.

COMBINED VALVE-LOCKING AND STORE-CLOSING MECHANISM.

SPECIFICATION forming part of Letters Patent No. 443,886, dated December 30, 1890.

Application filed April 10, 1890. Serial No. 347,414. (No model.)

*To all whom it may concern:*

Be it known that I, LEOPOLD WEIL, a citizen of the United States, residing at New York city, in the county and State of New York, have invented new and useful Improvements in Combined Valve-Locking and Store-Closing Mechanism, of which the following is a description.

My invention relates generally to a system for controlling the supply of water to a building, and relates particularly to special locking mechanism whereby in the act of closing the building at night it is absolutely necessary to first close the valve of the water-supply pipe and lock said valve in its closed position before the locking mechanism employed for the building can be operated and the building locked. In a concurrent application for Letters Patent I have described means for accomplishing this result, comprising a valve for closing the supply-pipe of a building, a lock for holding said valve in its closed position and provided with a bolt which can only be projected to hold said valve when the valve is closed to shut off the water-supply, and a key to said lock which can only be removed therefrom when the valve is closed and the bolt projected to hold said valve in its closed position. In the case just described, however, the key used to lock the building is connected with the key used to lock the valve in its closed position, and can only be removed from the valve-locking mechanism and used to lock the building when such mechanism is set in the position necessary to close the valve. The safeguard in such case, therefore, against the carelessness or negligence of the person whose duty it is to shut off the water-supply and lock the building at night is that the key employed to lock the building cannot be used for this purpose without first shutting off the water-supply by closing and locking the valve controlling the same. I find, however, that while this arrangement is ordinarily sufficient to accomplish the desired result it does not necessarily follow that the water-supply must be shut off before the building can be closed, because it is frequently the case that there are two or more keys to the same building, which are in the hands of different persons, so that the building might by carelessness be closed and locked at night by one of the additional keys, and in that case the water-supply might not be shut off. Of course this would be gross negligence and would probably occur very infrequently. However this may be, it is important in a system of protection against leakage or overflow of water in a building that the locking mechanism for the valve and building should be so arranged to operate with relation to each other that the building cannot be closed at night without first shutting off the water-supply and locking the valve in its closed position, no matter how careless or negligent the person locking the building may be.

To this end, therefore, my invention consists in locking mechanism for the valve and building, comprising a lock for said building, a lock for said valve, an obstruction to the movement of the bolt of the building-lock, said obstruction being projected in the path of said bolt when the building is open and being controlled only by the valve-lock key, which can only be removed from the valve when the valve is closed, whereby when the building is opened it is necessary in order to turn on the water-supply to first project the obstruction in the path of the bolt of the building-lock before the key can be used to operate the valve-lock, and when the building is closed it is first necessary to close the valve-lock before the valve-key can be used to remove said obstruction and permit the bolt of the building-lock to be shot, as usual, into the locking-plate or mortised recess to close the building.

My invention also includes details of construction and arrangement, all as hereinafter more fully described.

Figure 5:
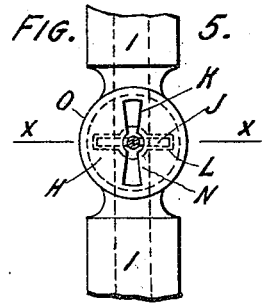
Figure 2:
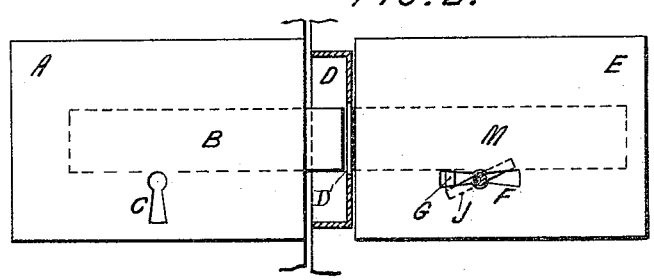
Figure 6:
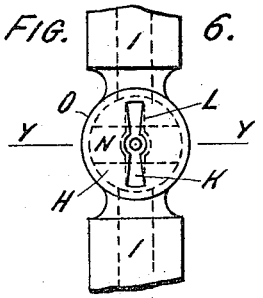
Figure 3:
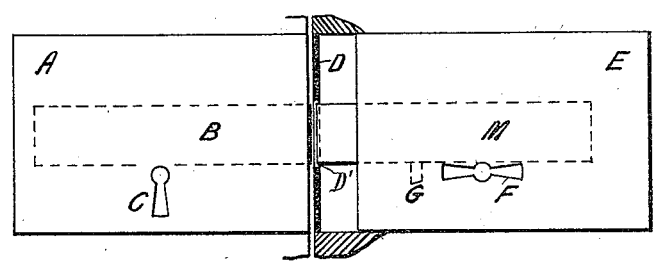
Figure 4:
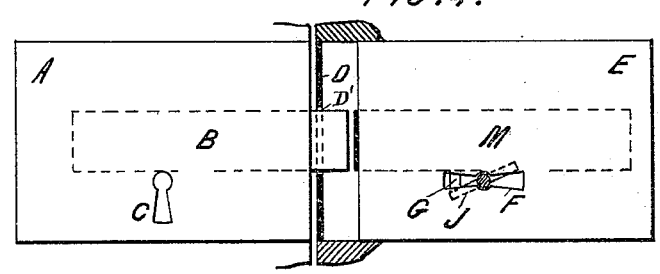

In the accompanying drawings, in the several figures of which like parts are designated by similar letters of reference, Figures 1, 3, and 9 are plan views of locking mechanism embodying my invention and showing the obstruction projected in the path of the building-lock bolt. Figs. 2, 4, and 10 are similar views showing said obstruction removed and the bolt projected in the usual manner to lock the building. Fig. 5 is a plan view of the valve-lock open, and Fig. 7 a central vertical section thereof taken on the line $x\,x$, Fig. 5. Fig. 6 is a plan view of the valve-lock closed, and Fig. 8 a central vertical section thereof taken on the line $y\,y$, Fig. 6.

A designates a casing or frame, B a locking-bolt, and C the key-hole, of an ordinary building-lock; and D designates the locking-plate, Figs. 1 and 2, or mortised recess, Figs. 3 and 4, into which the locking-bolt B is projected to lock the building.

Opposite to the lock A and in alignment therewith I arrange what may be termed a "locking device," which comprises a frame E, bolt M, key-hole F, key J, and stop G. This locking device may be an ordinary outside frame lock or mortised lock, depending in each case upon the character of the building-lock. For instance, the building-lock, as shown in Figs. 1 and 2, is what is known as an "outside" or "rim" lock, and as shown in Figs. 3 and 4, it is a mortised lock. In each case my locking device is of the same general construction as the building-lock, and is arranged so that its bolt when shot is projected in line with the building-lock and into the locking-plate or mortised recess D through an opening D′ in the rear thereof. Before proceeding, however, to describe the operation of these two locks with relation to each other, I will first proceed to describe the construction of the valve I intend to employ for the water-supply pipe. This valve is shown in Figs. 5, 6, 7, and 8 of the drawings and comprises a double coupling I I, a valve set between said couplings and comprising a casing O, having arranged therein a tapered plug H, provided with a port or way N of the usual form, and having at the upper portion of said tapered plug a recess L to receive a key J, by means of which the tapered plug H may be turned to open and close the valve. The casing O is also provided with a key-hole K, through which the key may be inserted into the recess L. To keep the plug to its seat, I use a common form of screw-washer P R.

Figure 7:
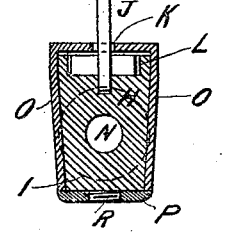
Figure 8:
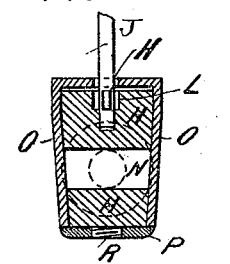

In the operation of my invention I employ a key for the valve, which fits the locking device and is capable of operating the bolt M, or the key employed in the locking device and the valve-key may be formed on the same shank, or separate keys may be used connected together, as by solder or a close ring, the intent being that the key for the locking device and the valve-lock key shall be inseparable. When the valve is open, as shown in Figs. 5 and 7 of the drawings, the valve-key cannot be removed from the valve; but when the valve is closed, as shown in Figs. 6 and 8, the key can be removed. (For the two positions of the key see particularly the dotted lines in Figs. 5 and 6.)

The key for the locking device can only be removed therefrom when the bolt M is shot into the locking-plate or mortised recess D, said bolt in this position constituting what I have heretofore termed an "obstruction" to the movement of the bolt of the building-lock. The movement of the key of the locking device is controlled by the stop G, and, as shown by the dotted lines in Figs. 2 and 4, the key cannot be withdrawn when the bolt M is retracted. It will thus be seen that when the building is opened, say, in the morning, it is necessary to first project the bolt M into the path of the bolt B before the valve-key can be used to unlock the valve and turn on the water-supply. The building cannot be locked at night until the bolt M is retracted from the path of the bolt B, and to accomplish this the valve-key must be removed from the valve, and, as stated, this cannot be done until the valve-plug is turned to close the valve and shut off the water-supply. Hence it follows that the building cannot be locked without first shutting off the water-supply, and the doing of this act is therefore not dependent upon the recollection or carefulness of any person.

In the modification illustrated in Figs. 9 and 10 of the drawings the obstruction to the bolt B consists of a hook-shaped detent T U, pivoted at V. This detent is operated by the valve-lock key or an attachment to the same, and this key or device J can only be removed from the lock when the detent T is in the position shown in Fig. 9, with its hook U resting in the notch W in the bolt B. In this position the bolt is retracted, and it cannot be shot to lock the building until the key or device J is inserted and turned to raise the detent out of the path of the bolt, as shown in Fig. 10. This modification does not depart from the principle of my invention, which is that an obstruction is forced and held in the path of the building-lock, and this obstruction can only be removed and the bolt shot to lock the building by means of a key or device which cannot be used until the valve controlling the water-supply has been closed and locked in its closed position.

It will be seen that a locking-valve of the construction shown set between two couplings can be readily connected to any supply-pipe, and the mechanism for controlling the building-lock, as described, can be conveniently applied, so that my invention can be utilized at small cost, and, if desired, without dispensing with the locks now in use.

My invention may also be employed for gas and steam pipes.

What I claim as my invention, and desire to secure by Letters Patent, is—

1. In means for preventing overflows or leakage, locking mechanism comprising a lock for the building, a lock for the valve, and an obstruction to the movement of the bolt of the building-lock, said obstruction being forced into the path of said bolt when the building is open and being removably operated by a key which can only be used when the valve is closed, substantially as described.

2. The combination, with a building-lock, of a movable obstruction to the bolt of said lock, a valve for the water-supply pipe, a key for said valve which cannot be removed therefrom until the valve is closed, and a key for operating said movable obstruction, attached to or forming part of the valve-key, substantially as described.

3. A movable obstruction controlling the bolt of a building-lock, a valve controlling the water-supply, a key to said valve removable when the valve is closed, and a key for operating said movable obstruction, attached to or forming part of the valve-key, substantially as described.

4. The combination of the oppositely-arranged locks A E, having bolts B M, a slotted plate or recess into which the said bolts are alternately shot and held, and a key for each lock, the key for lock E being attached to or forming part of the key for operating the valve of the water-supply, substantially as described.

In witness whereof I have hereunto subscribed my name, in the presence of two witnesses, this 28th day of March, A. D. 1890.

LEOPOLD WEIL.

Witnesses:
ERNEST C. WEBB,
FREDERIC CANAGAN.